United States Patent
Webb

(10) Patent No.: US 6,188,444 B1
(45) Date of Patent: Feb. 13, 2001

(54) APPARATUS AND METHODS FOR SYNTHESIZING FOREGROUND AND BACKGROUND IMAGES

(75) Inventor: Robert I. Webb, Lebanon, NJ (US)

(73) Assignee: NuWave Technologies, Inc., Fairfield, NJ (US)

(*) Notice: Under 35 U.S.C. 154(b), the term of this patent shall be extended for 0 days.

(21) Appl. No.: 09/040,200

(22) Filed: Mar. 13, 1998

(51) Int. Cl.[7] ............................................ H04N 5/21
(52) U.S. Cl. .................... 348/625; 348/630; 348/710; 348/712
(58) Field of Search .................... 348/625, 630, 348/631, 707, 708, 710, 712; H04N 5/21, 9/77

(56) References Cited

U.S. PATENT DOCUMENTS

| | | | |
|---|---|---|---|
| 4,030,121 | * | 6/1977 | Faroudja . |
| 4,445,152 | | 4/1984 | Karlock . |
| 5,321,511 | * | 6/1994 | Min ...................................... 348/625 |
| 5,848,181 | * | 12/1998 | Ogata .................................. 348/672 |
| 5,940,141 | * | 8/1999 | Faroudja .............................. 348/628 |

* cited by examiner

*Primary Examiner*—Sherrie Hsia
(74) *Attorney, Agent, or Firm*—Steven J. Adamson

(57) ABSTRACT

An apparatus and method for improving the clarity of a picture produced from a video signal. A differentiation circuit is provided that produces a responsive correction signal. Mechanisms for adjusting the shape (width, amplitude, etc.) of the correction signal are disclosed. Disabling the correction signal during blanking intervals and synchronization is also disclosed, among other features.

43 Claims, 2 Drawing Sheets

APPARATUS AND METHODS FOR SYNTHESIZING FOREGROUND AND BACKGROUND IMAGES

This application is related to U.S. patent application entitled Video Picture Improving Apparatus and Method, Ser. No. 09/040,232, filed Mar. 14, 1998 and U.S. patent application entitled Satelite Broadcast Video Picture Improving Apparatus and Method, Ser. No. 09/040,233, filed Mar. 14, 1998. The present application and the two related applications are commonly assigned. The two related application are hereby incorporated by reference as though they were included herein.

FIELD OF THE INVENTION

The present invention relates to processing a video signal and more specifically to processing a video signal to improve clarity and related attributes of the video picture projected therefrom.

BACKGROUND OF THE INVENTION

A common method of propagating a video signal includes separating the signal into luminance (Y) and chrominance (C) components and processing these components in parallel. The luminance signal relates to the intensity or brightness and by FCC regulation has a range of 714 mV. The chrominance signal relates to color. Techniques for combining the luminance and chrominance signals for display on a monitor or projection on a screen are known in the art.

As the luminance signal is propagated across a scan line, changes in brightness are achieved by transitioning the luminance signal from one voltage level to another.

Referring to FIG. 1A, a diagram of an "ideal" luminance signal illustrating several upward and downward transitions is shown. FIG. 1A illustrates the horizontal blanking interval 8, the horizontal synchronization pulse 9, base black level 11 and maximum white level 13. FIG. 1A also illustrates a series of positive transitions from black to white followed by a series of negative transitions from white to black. The waveform of FIG. 1A is termed "ideal" because all of the transitions 15 have square or sharply transitioning corners. The square corners result in a crisp change in intensity between pixels along a scan line and hence a clearer or more in-focus picture.

In reality, however, the luminance signal normally does not have square cornered transitions. Referring to FIG. 1B, a typical luminance signal waveform with soft or rounded corners is shown. The rounded corners are induced from transmission equipment (that cannot process the higher harmonics that cause square corners) and transmission losses, amongst other causes.

Prior art attempts to overcome the soft or rounded transitions have included generating a correction pulse that is added to the luminance signal during a transition. U.S. Pat. No. 4,445,152, issued to Karlock describes such a device. While the device of Karlock and similar devices have beneficial aspects, they also have disadvantageous aspects. For example, Karlock utilizes a complicated circuit having a common base transistor arrangement (the clamping circuit) and a diode based clipping arrangement.

Shortcomings of this clamping/clipping circuit include that a correction pulse must be greater than approximately 0.7V to overcome $V_{BE}$ of the transistors and the clipping diodes provide only a single pulse amplitude cut-off level. A further problem with the common base transistor arrangement and the like is that when the board level device is reduced to an ASIC level (i.e., semiconductor implementation) the common base and like arrangements necessitate a bi-CMOS implementation which requires an additional layer of conductive material and significantly increases the cost of the ASIC (e.g., typically by more than one-third). Elimination of one or more of the transistors would permit ASIC formation using normal CMOS.

Other disadvantageous aspects of Karlock and other prior art devices include that the correction pulse may not have the proper shape (in width and/or amplitude) for a desired correction, user adjustment of the correction pulse is not provided, and clarity improvements (i.e., the addition of the correction pulse to the luminance signal) is not turned off during horizontal (H) and vertical (V) synchronization and the H and V blanking intervals. Failure to turn off the correction signal during H and V synchronization and the H and V blanking intervals may result, for example, in a signal being added to the synchronization signal that is sufficient to disrupt synchronization. In addition, the device of Karlock and those of other prior art references use an undesirably large number of components which tends to make their circuits more expensive to produce (both component cost and assembly), more likely to fail and more consumptive of real estate.

SUMMARY OF THE INVENTION

Accordingly, it is an object of the present invention to provide an apparatus and method that improves clarity in a picture produced from a video signal.

It is another object of the present invention to achieve such improved clarity by generating a more appropriate luminance correction signal.

It is a another object of the present invention to provide a more rapid or "responsive" correction signal.

It is another object of the present invention to provide control of the amplitude and width of the correction signal.

It is another object of the present invention to be able to turn off the correction signal during the H and V blanking intervals.

It is another object of the present invention to provide an arrangement of circuit components that does not have a common base or other configuration that would require ASIC fabrication in bi-CMOS or other generally more expensive fabrication techniques.

It is also an object of the present invention to provide a luminance correction circuit that utilizes a reduced number of components, rendering it more straight forward to implement, less expensive and more reliable, amongst other attributes.

These and related objects of the present invention are achieved by use of an apparent clarity improving apparatus and method as described herein.

The attainment of the foregoing and related advantages and features of the invention should be more readily apparent to those skilled in the art, after review of the following more detailed description of the invention taken together with the drawings.

DETAILED DESCRIPTION

Figure 2:
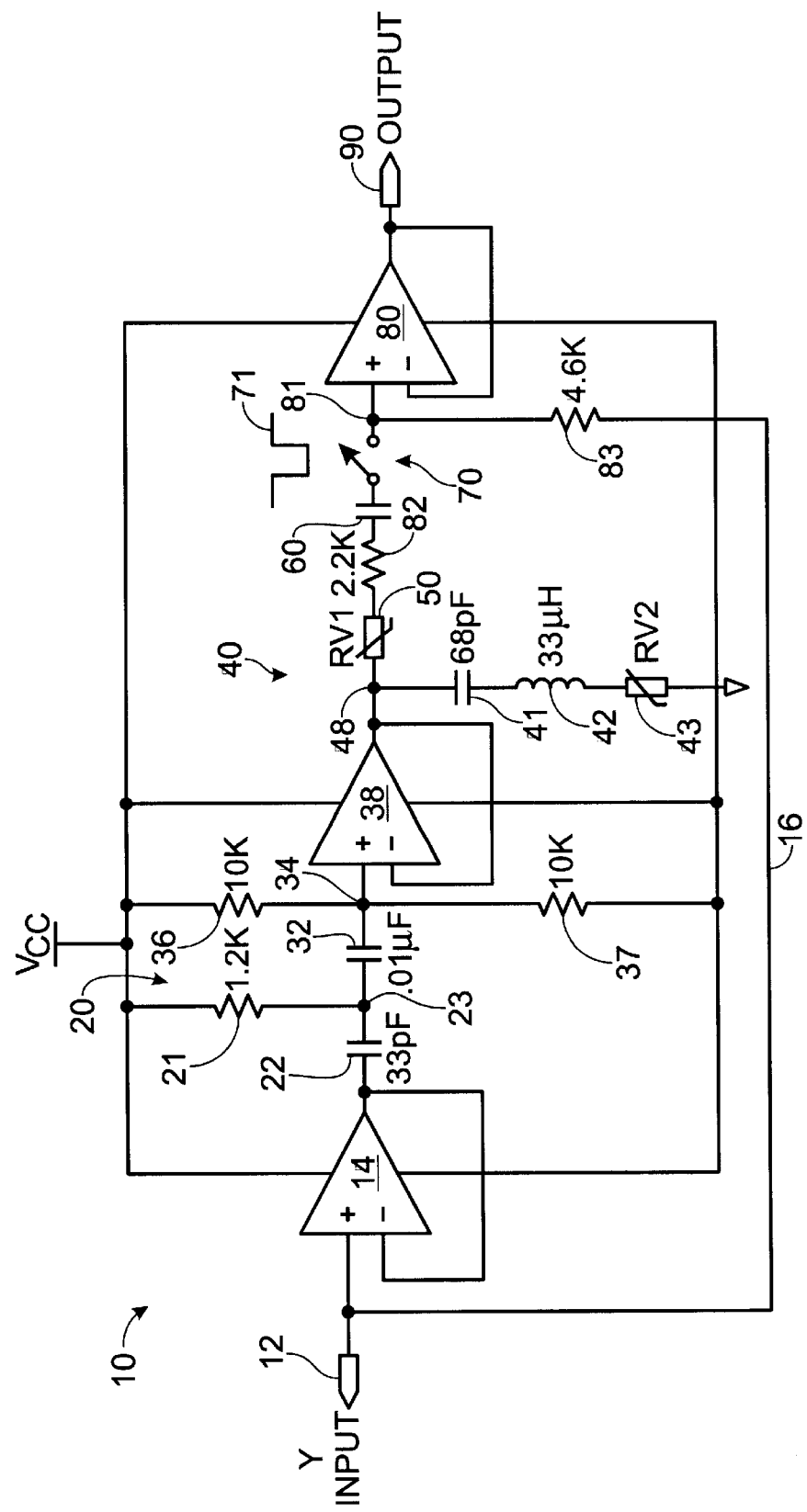
FIG. 2 is a schematic diagram of a clarity improving circuit in accordance with the present invention.

Referring to FIG. 2, a schematic diagram of a clarity improving circuit 10 in accordance with the present invention is shown. Circuit 10 receives a luminance signal at input 12. The input luminance signal is propagated to both a buffer amplifier 14 (hereinafter referred to as "buffer 14") and a bypass conductor 16. Buffer 14 operates essentially as a conventional buffer providing isolation and impedance matching and while buffer 14 may be implemented in many ways, in a preferred embodiment it is implemented using an operational amplifier. The luminance signal is the non-inverting input and the inverting input receives output feedback representing unity gain. Conventional pull-up and pull-down resistor are not shown in FIG. 2.

Figure 3:
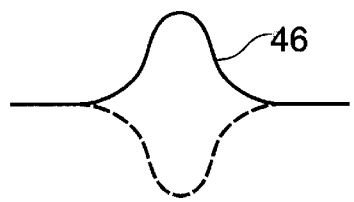
FIG. 3 is a diagram of a pulse created from a transition of a luminance signal in accordance with the present invention.

The output of buffer 14 is coupled to a differentiation circuit 20 that contains a resistor 21 and a capacitor 22. When the luminance signal experiences a positive or a negative transition, a corresponding positive or negative pulse is generated by RC 21,22. This pulse is shown in FIG. 3. The steepness of the rise or fall (and width) of this pulse is determined by the values of RC 21,22.

In a preferred embodiment, the circuit of FIG. 2 is implemented in an ASIC utilizing CMOS technology. While resistor 21 has a conventional value which in circuit 10 is 1.2K (but which may range as is known), reducing the value of capacitor 22 reduces the time constant and hence increases the responsiveness of the correction pulse. As alluded to the Background of the Invention section, the present invention does away with a common base or like configuration and in so doing permits efficient fabrication in CMOS, for example, as a CMOS ASIC. CMOS in turn permits the formation of capacitors of lower capacitance values than can be achieved in board level capacitors. This benefit is achieved in part because CMOS has a relatively low current impedance associated therewith, permitting the formation of low level RC circuits that are not appreciably loaded. Hence formation of capacitor 22 in CMOS or the like achieves a lower capacitance value and a quicker correction signal response time. Fabrication with MOS material also permits the use of a single ended power source voltage (as opposed to the double ended ±12V power supplies of Karlock). 5V, 3V and other power source voltage levels are contemplated.

In a preferred embodiment, capacitor 22 has a value of less than 50 pF and more preferably approximately 33 pF. While values for RC 21,22 are provided herein, it should be recognized that the values are directed towards achieving a quick rise/fall time and since R and C have a known relationship, other combinations to achieve a desired time constant value would be apparent to one skilled in the art and are included within this invention. The RC time constant provided by a 1.2 kOhms resistor and a 33 pF capacitor is 39.6 (approximately 40) nS. If a 50 pF capacitor were used, the time constant would be 60 nS.

The correction pulse generated by the differentiation circuit (measured at point 23) is preferably AC coupled through a coupling capacitor 32 to an isolation buffer 38. Coupling capacitor 32 is large compared to capacitor 22 and has a preferred value of approximately 0.01 $\mu$F. Capacitor 32 creates a high impedance condition at the input (point 34) of buffer 38. Two 10K ohms resistor 36,37 in conjunction with the high impedance condition at point 34 create a DC reference voltage that is ½ VCC (effectively creating a constant current source). The DC reference voltage provides a fixed baseline from which positive and negative correction signals ascend or descend, respectively.

Figure 4:
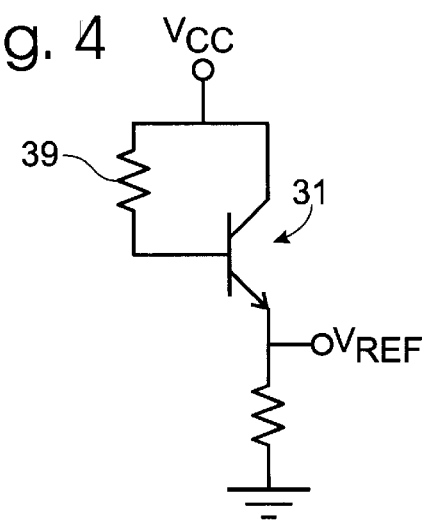
FIG. 4 is a schematic diagram of an alternative reference voltage generating circuit in accordance with the present invention.

While capacitor 32 and resistors 36,37 are a preferred manner of achieving a DC bias or reference voltage (i.e., a constant current source or the like) at point 34, it should be recognized that there are other manners of achieving same. One of these alternative manners is shown in FIG. 4. In the embodiment of FIG. 4, a bipolar transistor 31 that has a base coupled through resistor 39 to VCC provides an approximately 0.7 $V_{BE}$ voltage drop, thereby creating a reference voltage of approximately 4.3V (assuming 5V VCC). Other manners of achieving a reference voltage or constant current source are contemplated by the inventors using known techniques and are intended to be within the present invention.

Figure 1A:
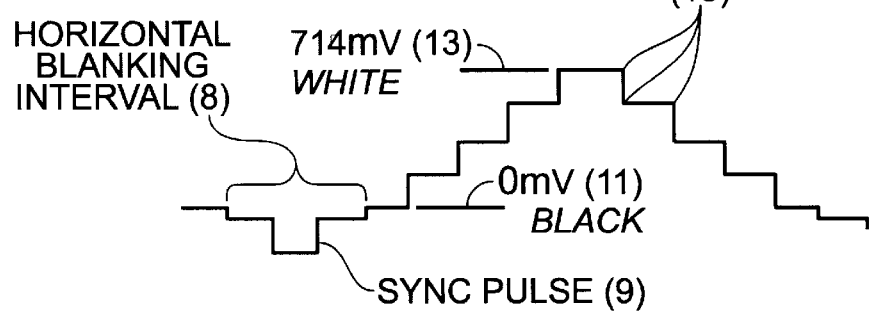
FIGS. 1A and 1B are respectively diagrams an ideal and a typical luminance signals illustrating several upward and downward transitions.
Figure 1B:
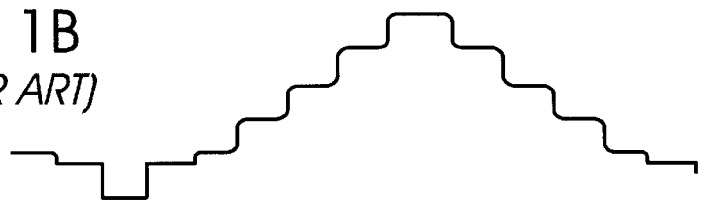
Figure 5:
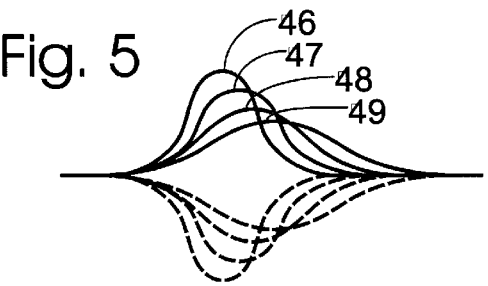
FIG. 5 is a diagram of possible modifications to the pulse of FIG. 3 in accordance with the present invention.

Referring back to FIG. 2, the output of amplifier buffer 38 (which is preferably implemented using operational amplifiers as was the case with buffer 14 and is hereinafter referred to as "buffer 38") is coupled to a tunable filter circuit 40. Tunable filter circuit 40 preferably includes a capacitor 41, an inductor 42, and a tunable resistive device 43 such as a potentiometer or an electrically tunable resistive device. The tunability of filter circuit 40 permits the width of the correction pulse to be modified and a correction pulse so modified may be termed an operative pulse. Representative modifications or "adjustments" are shown in FIG. 5. Pulse 46 is the sharp pulse of FIG. 3. In some instances, this pulse may provide the desired correction (for example, in a lower magnitude luminance transition), however, in other instances it may be desirable to lengthen the transition pulse. This is done by filtering out the harmonics that are attributable to the shape of pulse 46. A similar process occurs in the rounding out of the luminance signal transitions between FIGS. 1A and 1B. Pulses 47–49 illustrate increased amounts of filtering or in other words increased pulse width expansion.

The tunable filtering/noise reduction of device 43 may be accomplished in a plurality of ways. For example, on a board level embodiment, device 43 may be an off-the-shelf potentiometer or other known device. In an ASIC or semiconductor embodiment, device 43 may be a collection of selectable (multiplexed) resistors where a digital code selects the resistor through which current is passed. Other semiconductor devices utilizing transconductance and voltage controlled impedance are also contemplated.

The output of tunable filter 40 is coupled to an amplitude attenuation circuit 50. While circuit 40 adjusted the width of the correction pulse, attenuation circuit 50 adjusts the amplitude of the pulse. Attenuation circuit 50 preferably provides user selectable attenuation from 0 to 100%. In a board level implementation, attenuation may be achieved with a potentiometer, a voltage controlled amplifier or another suitable attenuation device (as was the case with device 43). In an ASIC implementation, attenuation may be achieved with a voltage controlled amplifier, a collection of electrically selectable resistive elements or through any other suitable means for achieving attenuation in a semiconductive medium. Control of a voltage controlled amplifier may be provided from a digital word that is d-to-a converted into the analog control voltage.

Assuming 5V VCC and unity gain in the buffer amplifiers 14,38, the DC component of the voltage at point 48 (before attenuation circuit 50) is large compared to the 0 to 714 mV luminance signal. Accordingly, the output of the attenuation circuit is AC coupled to downstream circuit components such that only the correction pulse is passed. AC coupling capacitor 60 preferably performs this function and has a value of approximately 22 $\mu$F. AC coupling capacitor 60 is coupled to a switch/gate 70 that is preferably electrically controlled to turn off luminance signal correction during H and V synchronization and during the H and V blanking internals. Waveform 71 represents a control signal waveform showing a disable pulse that preferably has a width sufficient to cover the synchronization and color burst signal of the relevant blanking interval. Suitable switches for board level and ASIC design and their control are known in the art.

At point 81, the correction pulse and the original luminance signal propagated on line 16 are added. Resistors 82 and 83 are provided for appropriate isolation. The magnitude of capacitor 60 relative to resistor 82 is such that no appreciable time constant is generated.

Buffer amplifier 80 propagates the combined luminance and correction pulse signal to output 90. Buffer amplifier 90 provides isolation and may be implemented as discussed above for buffers 14 and 38.

Figure 6:
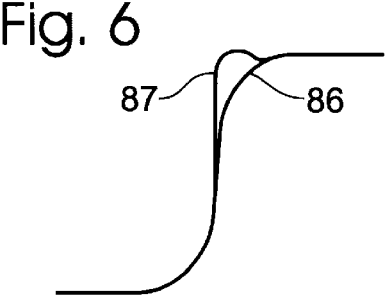
FIG. 6 is a diagram of a luminance signal in a positive transition that has had a correction signal added thereto in accordance with the present invention.

Referring to FIG. 6, a diagram of a luminance signal in a positive transition that has had a correction signal added thereto is shown in accordance with the present invention. Signal 86 represents the original luminance signal with rounded edges. Signal 87 represents the same signal after a correction pulse has been added thereto, making the transition more rapid and the corner more square.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An apparatus for improving apparent clarity of a picture produced from a video signal, comprising:

an analog differentiation circuit having a singular analog differentiator that receives as input a luminance signal and that creates a correction signal in response to a transition of that luminance signal;

a filter that modifies the shape of the correction signal; and a mechanism that combines the modified correction signal to the luminance signal at the corresponding transition thereof.

2. The apparatus of claim 1, wherein the amount of said modification is user selected.

3. The apparatus of claim 1, wherein said modification includes modifying the width of the correction signal.

4. The apparatus of claim 2, wherein said filter includes a resistor and at least one of a capacitor and an inductor, and the value of said resistor is user selectable.

5. The apparatus of claim 3, further comprising a mechanism that modifies the amplitude of the correction signal.

6. The apparatus of claim 1, further comprising an isolation buffer coupled between said differentiation circuit and said filter.

7. The apparatus of claim 1, further comprising a constant current source coupled between said differentiation circuit and said filter.

8. The apparatus of claim 1, further comprising a mechanism that disables the correction signal during a blanking interval of the input luminance signal.

9. The apparatus of claim 1, wherein said differentiation circuit has a capacitor of less than 50 pF.

10. The apparatus of claim 1, wherein said apparatus is fabricated in metal-oxide-semiconductor (MOS) material.

11. The apparatus of claim 10, wherein said MOS material is complementary metal-oxide-semiconductor (CMOS) material.

12. An apparatus for improving apparent clarity of a picture produced from a video signal, comprising:

a differentiation circuit that receives as input a luminance signal and that creates an analog correction signal in response to a transition of that luminance signal;

a filter that modifies the shape of the analog correction signal; and a mechanism that combines the modified analog correction signal to the luminance signal at the corresponding transition thereof;

wherein said differentiation circuit and said filter are powered by a single ended power supply having a magnitude of substantially 5V or less.

13. An apparatus for improving apparent clarity of a picture produced from a video signal, comprising:

a differentiation circuit that receives as input a luminance signal and that creates a correction signal in response to a transition of that luminance signal;

a mechanism that combines the correction signal to the input luminance signal; and a mechanism for that disables the correction signal during a blanking interval of the input luminance signal.

14. The apparatus of claim 13, wherein said disabling mechanism includes a switch that is controlled by a blanking internal signal such that at a blanking interval said switch does not permit said correction signal to propagate to said combining mechanism.

15. The apparatus of claim 13, further comprising a mechanism that modifies at least one of the amplitude and width of the correction signal.

16. The apparatus of claim 15, further comprising an isolation buffer coupled between said differentiation circuit and said modifying mechanism.

17. The apparatus of claim 15, further comprising a constant current source coupled between said differentiation circuit and said modifying mechanism.

18. The apparatus of claim 13, wherein said differentiation circuit includes a capacitor of less than 50 pF.

19. The apparatus of claim 13, wherein said apparatus is fabricated in metal-oxide-semiconductor (MOS) material.

20. The apparatus of claim 13, further comprising a single ended power supply having a magnitude of substantially 5V or less.

21. An apparatus for improving apparent clarity of a picture produced from a video signal, comprising:

a differentiation circuit that receives as input a luminance signal and that creates a correction signal in response to a transition of that luminance signal;

a mechanism that modifies the amplitude of the correction signal; and a mechanism that combines the amplitude modified correction signal to the luminance signal at the corresponding transition of that luminance signal; and wherein the amount of amplitude modification is user selectable.

22. The apparatus of claim 21, wherein the differentiation circuit and the modifying mechanism are powered by a single ended power supply having a magnitude of substantially 5V or less.

23. The apparatus of claim 21, wherein said amplitude modification is achieved with a variable resistance mechanism.

24. The apparatus of claim 21, wherein said amplitude modification is achieved with voltage controlled amplification.

25. The apparatus of claim 21, further comprising a mechanism that modifies the width of the correction signal.

26. The apparatus of claim 21, further comprising a mechanism that disables the correction signal during a blanking interval of the input luminance signal.

27. An apparatus for improving apparent clarity of a picture produced from a video signal, comprising:
 a differentiation circuit that receives as input a luminance signal and that creates an analog correction pulse in response to a transition of that luminance signal; and
 a mechanism that combines the analog correction pulse to the input luminance signal at the corresponding transition of that luminance signal;
 wherein the differentiation circuit includes a capacitor and a resistor that create a differentiation circuit time constant that has a value of less than 180 ns.

28. The apparatus of claim 27, wherein said capacitor has a value of less than 50 pF.

29. The apparatus of claim 27, further comprising a mechanism that extends the width of said correction pulse before combination with said input luminance signal.

30. The apparatus of claim 27, wherein said apparatus is fabricated in metal-oxide-semiconductor (MOS) material.

31. The apparatus of claim 27, further comprising a mechanism that modifies at least one of the width and amplitude of said pulse and the modification of said one of said width and said amplitude is user selectable.

32. An apparatus for improving apparent clarity of a picture produced from a video signal, comprising:
 a differentiation circuit that receives as input a luminance signal and that creates a correction pulse in response to a transition of that luminance signal;
 a pulse width extension circuit that functions only to extend the width of said correction pulse; and
 a mechanism that combines the width extended correction pulse to an input luminance signal at the corresponding transition.

33. The apparatus of claim 32, in which said differentiation circuit is singular.

34. The apparatus of claim 32, further comprising a constant current source coupled between said differentiation circuit and said pulse width extension circuit.

35. An apparatus for improving apparent clarity of a picture produced from a video signal, comprising:
 a differentiation circuit that receives as input a luminance signal and that creates a correction signal in response to a transition of that luminance signal; and
 a mechanism that combines the correction signal to the input luminance signal;
 wherein the differentiation circuit includes a capacitive element and a resistive element that create a time constant for said correction signal of less than substantially 60 ns.

36. An apparatus for improving apparent clarity of a picture produced from a video signal, comprising:
 a differentiation circuit that receives as input a luminance signal and that creates a correction signal in response to a transition of that luminance signal;
 a filter that modifies the shape of the correction signal; and
 a mechanism that combines the modified correction signal to the luminance signal at the corresponding transition thereof;
 wherein the amount of said modification is user selectable.

37. The apparatus of claim 36, wherein said filter includes a resistor and at least one of a capacitor and an inductor, and the value of said resistor is user selectable.

38. An apparatus for improving apparent clarity of a picture produced from a video signal, comprising:
 a differentiation circuit that receives as input a luminance signal and that creates a correction signal in response to a transition of that luminance signal;
 a filter that modifies the shape of the correction signal;
 a mechanism that combines the modified correction signal to the luminance signal at the corresponding transition thereof; and
 an isolation buffer coupled between said differentiation circuit and said filter.

39. An apparatus for improving apparent clarity of a picture produced from a video signal, comprising:
 a differentiation circuit that receives an input a luminance signal and that creates a correction signal in response to a transition of that luminance signal; and
 a filter that modifies the shape of the correction signal;
 a mechanism that combines the modified correction signal to the luminance signal at the corresponding transition thereof; and
 a constant current source coupled between said differentiation circuit and said filter.

40. An apparatus for improving apparent clarity of a picture produced from a video signal, comprising:
 a differentiation circuit that receives as input a luminance signal and that creates a correction signal in response to a transition of that luminance signal; and
 a filter that modifies the shape of the correction signal;
 a mechanism that combines the modified correction signal to the luminance signal at the corresponding transition thereof; and
 a mechanism that disables the correction signal during a blanking interval of the input luminance signal.

41. An apparatus for improving apparent clarity of a picture produced from a video signal, comprising:
 a differentiation circuit that receives as input a luminance signal and that creates a correction signal in response to a transition of that luminance signal;
 a filter that modifies the shape of the correction signal; and
 a mechanism that combines the modified correction signal to the luminance signal at the corresponding transition thereof;
 wherein said apparatus is fabricated in metal-oxide-semiconductor (MOS) material.

42. The apparatus of claim 41, wherein said MOS material is complementary metal-oxide-semiconductor (CMOS) material.

43. An apparatus for improving apparent clarity of a picture produced from a video signal, comprising:
 a differentiation circuit that receives as input a luminance signal and that creates a correction signal in response to a transition of that luminance signal;

a modification circuit that modifies the shape of the correction signal; and a mechanism that combines the modified correction signal to the luminance signal at the corresponding transition thereof; and wherein said differentiation circuit has a differentiation circuit time constant defined at least in part by a capacitor having a value of less than 50 pF.

* * * * *

UNITED STATES PATENT AND TRADEMARK OFFICE
CERTIFICATE OF CORRECTION

PATENT NO. : 6,188,444 B1  Page 1 of 1
DATED : February 13, 2001
INVENTOR(S) : Robert I. Webb It is certified that error appears in the above-identified patent and that said Letters Patent is hereby corrected as shown below:

<u>Title page, Item [54], and Column 1, lines 1-3,</u>
"APPARATUS AND METHODS FOR SYNTHESIZING FOREGROUND AND BACKGROUND IMAGES" should read, -- VIDEO SIGNAL TRANSITION PROCESSING APPARATUS AND METHOD --.

Signed and Sealed this

Twenty-fifth Day of December, 2001

Attest:

*Attesting Officer*

JAMES E. ROGAN
*Director of the United States Patent and Trademark Office*